United States Patent
McCain et al.

(10) Patent No.: US 9,395,617 B2
(45) Date of Patent: *Jul. 19, 2016

(54) PANORAMIC MULTI-SCALE IMAGER AND METHOD THEREFOR

(71) Applicants: Applied Quantum Technologies, Inc., Durham, NC (US); Duke University, Durham, NC (US)

(72) Inventors: Scott Thomas McCain, Durham, NC (US); David Jones Brady, Durham, NC (US); Daniel Marks, Durham, NC (US)

(73) Assignee: Applied Quantum Technologies, Inc., Durham, NC (US)

( * ) Notice: Subject to any disclaimer, the term of this patent is extended or adjusted under 35 U.S.C. 154(b) by 603 days.

This patent is subject to a terminal disclaimer.

(21) Appl. No.: 13/740,021

(22) Filed: Jan. 11, 2013

(65) Prior Publication Data

US 2014/0139623 A1 May 22, 2014

Related U.S. Application Data

(63) Continuation-in-part of application No. 12/651,894, filed on Jan. 4, 2010, now Pat. No. 8,259,212.

(51) Int. Cl.
*G03B 37/00* (2006.01)
*H04N 5/232* (2006.01)
*G02B 13/06* (2006.01)
*H04N 5/225* (2006.01)

(52) U.S. Cl.
CPC ............... *G03B 37/00* (2013.01); *G02B 13/06* (2013.01); *H04N 5/2251* (2013.01); *H04N 5/23238* (2013.01)

(58) Field of Classification Search
CPC ...... G02B 13/06; G03B 37/00; H04N 5/2251; H04N 5/23238
USPC .......................................................... 348/38
See application file for complete search history.

(56) References Cited

U.S. PATENT DOCUMENTS

3,669,527 A 6/1972 Fuller
4,184,749 A 1/1980 Grossman
(Continued)

FOREIGN PATENT DOCUMENTS

EP 0809124 A3 7/1998
EP 0893915 A2 1/1999
(Continued)

OTHER PUBLICATIONS

Tissire, Abdelaaziz, "Related U.S. Appl. No. 13/095,407 Office Action", Mar. 15, 2013, Publisher: USPTO, Published in: US.
(Continued)

*Primary Examiner* — Behrooz Senfi
(74) *Attorney, Agent, or Firm* — Kaplan Breyer Schwarz & Ottesen LLP

(57) ABSTRACT

A panoramic imager comprising a mirror and a multi-scale imaging system is presented. The multi-scale imaging system comprises an objective lens and a plurality of cameras that is arranged in a non-planar arrangement at the image field of the objective lens. The objective lens reduces a first aberration introduced by the mirror, and each camera further reduces any residual first aberration. As a result, panoramic imagers of the present invention can provide improved image quality and higher resolution than panoramic imagers of the prior art.

25 Claims, 9 Drawing Sheets

(56) References Cited

U.S. PATENT DOCUMENTS

| | | | |
|---|---|---|---|
| 4,323,925 | A | 4/1982 | Abell et al. |
| 5,004,328 | A | 4/1991 | Suzuki et al. |
| 5,012,081 | A | 4/1991 | Jungwirth et al. |
| 5,161,062 | A | 11/1992 | Shafer et al. |
| 5,311,611 | A | 5/1994 | Migliaccio |
| 6,097,551 | A | 8/2000 | Kreitzer |
| 6,137,535 | A * | 10/2000 | Meyers .................. 348/340 |
| 6,320,703 | B1 | 11/2001 | Chen et al. |
| 6,339,506 | B1 | 1/2002 | Wakelin et al. |
| 6,556,349 | B2 | 4/2003 | Cox et al. |
| 7,123,777 | B2 * | 10/2006 | Rondinelli et al. ........... 382/284 |
| 8,259,212 | B2 | 9/2012 | Brady et al. |
| 2003/0106208 | A1 | 6/2003 | Hosier et al. |
| 2003/0231255 | A1 | 12/2003 | Szajewski et al. |
| 2004/0061787 | A1 | 4/2004 | Liu et al. |
| 2004/0212882 | A1 * | 10/2004 | Liang et al. .................. 359/462 |
| 2005/0052751 | A1 | 3/2005 | Liu et al. |
| 2005/0109918 | A1 | 5/2005 | Nikzad et al. |
| 2005/0174643 | A1 | 8/2005 | Lee et al. |
| 2006/0054782 | A1 | 3/2006 | Olsen et al. |
| 2006/0055811 | A1 | 3/2006 | Frtiz et al. |
| 2006/0209292 | A1 | 9/2006 | Dowski, Jr. et al. |
| 2007/0109438 | A1 | 5/2007 | Duparre et al. |
| 2007/0252074 | A1 | 11/2007 | Ng et al. |
| 2008/0080066 | A1 * | 4/2008 | Saito ............................. 359/719 |
| 2008/0123205 | A1 * | 5/2008 | Nakano et al. ................ 359/859 |
| 2009/0140131 | A1 | 6/2009 | Utagawa |
| 2009/0303595 | A1 | 12/2009 | Lim et al. |
| 2010/0103300 | A1 | 4/2010 | Jones et al. |
| 2010/0171866 | A1 * | 7/2010 | Brady et al. .................. 348/340 |
| 2010/0264502 | A1 | 10/2010 | Christophersen et al. |
| 2011/0211106 | A1 | 9/2011 | Marks et al. |
| 2011/0268868 | A1 | 11/2011 | Dowski, Jr. et al. |
| 2013/0076900 | A1 | 3/2013 | Mrozek et al. |
| 2013/0242060 | A1 | 9/2013 | Brady et al. |
| 2014/0139623 | A1 | 5/2014 | McCain et al. |
| 2014/0176710 | A1 | 6/2014 | Brady et al. |
| 2014/0192254 | A1 | 7/2014 | Marks et al. |
| 2014/0320708 | A1 | 10/2014 | Marks et al. |

FOREIGN PATENT DOCUMENTS

| | | |
|---|---|---|
| JP | S-6381413 A | 4/1988 |
| JP | H04196689 A | 7/1992 |
| JP | H-05226218 A | 9/1993 |
| JP | 035999 A | 2/1995 |
| JP | H-09509265 A | 9/1997 |
| JP | 2001-005054 A | 1/2001 |
| JP | 2003-283932 A | 10/2003 |
| JP | 2001-151718 A | 5/2004 |
| JP | 2004526300 A | 8/2004 |
| JP | 2005045141 | 2/2005 |
| JP | 2005136325 A | 5/2005 |
| JP | 2007-004471 A | 1/2007 |
| WO | 9523349 A1 | 8/1995 |
| WO | 9926419 A1 | 5/1999 |

OTHER PUBLICATIONS

"Related Japanese Patent Application No. JP 2011-544647", "Office Action", Dec. 3, 2013, Publisher: JPO, Published in: JP.

"Related U.S. Appl. No. 13/095,407", "Non-Final Office Action", Feb. 19, 2014, Publisher: USPTO, Published in: US.

Lam, Edmund Y., "Compact and Thin Multi-lens System for Machine Vision Applications", "Image Processing: Machine Vision Applications", 2008, vol. 6813, Publisher: SPIE-IS&T Electronic Imaging.

Duparre et al., "Microoptical telescope compound eye", "Optics Express", Feb. 7, 2005, vol. 13, No. 3, Publisher: Optical Society of America, Published in: US.

Brady et al., "Multiscale lens design", "Optics Express 10659", Jun. 22, 2009, vol. 17, No. 13, Publisher: Optical Society of America, Published in: US.

Christensen et al., "Multiscale Optical Design for Global Chip-to-Chip Optical Interconnections and Misalignment Tolerant Packaging", "IEEE Journal on Selected Topics in Quantum Electronics", Mar./Apr. 2003, vol. 9, No. 2, Publisher: IEEE.

Duparre et al., "Thin compound-eye camera", "Applied Optics XP-002578598", 2005, vol. 44, No. 15, Publisher: Optical Society of America, Published in: US.

"Japanese Patent Application No. 2011-544647 Office Action", Dec. 11, 2012, Publisher: JIPO, Published in: JP.

Hylla, Winfried, "PCT Application No. PCT/US2010/020077 International Preliminary Report on Patentability Mar. 31, 2011", , Publisher: PCT, Published in: PCT.

Hylla, Winfried, "PCT Application No. PCT/US2010/020077 International Search Report May 4, 2010", , Publisher: PCT, Published in: PCT.

J. S. Chahl and M. V. Srinivasan, "Reflective surfaces for panoramic imaging", "Applied Optics", Nov. 1, 1997, pp. 8275-8285, vol. 36, No. 31, Publisher: Optical Society of America, Published in: AU.

Kelly J. Jerabek, "U.S. Appl. No. 12/651,894 Office Action", Mar. 14, 2012, Publisher: USPTO, Published in: US.

"First Office Action", issued in related EP Patent Application No. 10 701 047.2, dated Aug. 3, 2015.

"Office Action", issued in counterpart Japanese patent application No. 2011-544647, dated Sep. 3, 2014.

"Office Action", issued in counterpart Japanese patent application No. 2013-508216, dated Mar. 19, 2015.

"Final Office Action" issued in co-pending U.S. Appl. No. 14/313,233, dated Jul. 1, 2015.

"Office Action", issued in counterpart JP Application No. JP 2011-544647; dated Oct. 29, 2015, Published in: JP.

"Non Final Office Action" dated Oct. 5, 2015, issued in related U.S. Appl. No. 13/889,007.

"Notice of Allowance", issued in related U.S. Appl. No. 14/313,233; dated Oct. 2, 2015.

"Final Office Action" issued in related U.S. Appl. No. 13/899,007, dated Mar. 25, 2016.

"Notice of Allowance" issued in in related Japanese Application No. 2013-508216 on Jan. 12, 2016.

"Non Final Office Action" issued in related U.S. Appl. No. 14/185,364, dated Feb. 8, 2016.

* cited by examiner

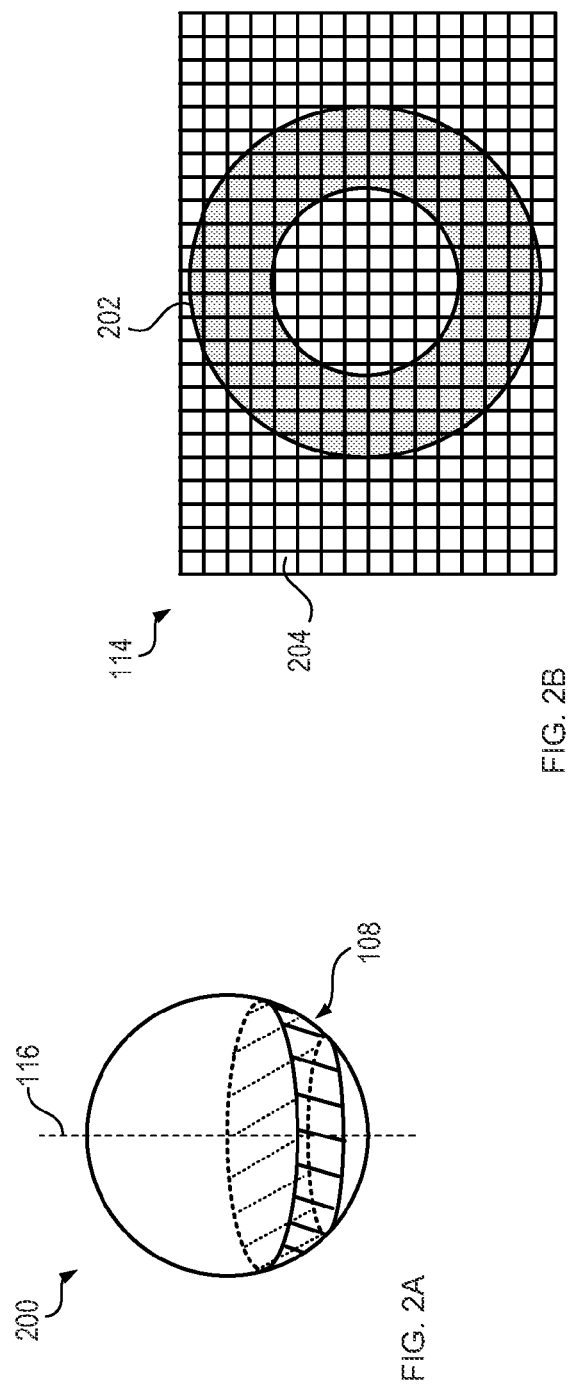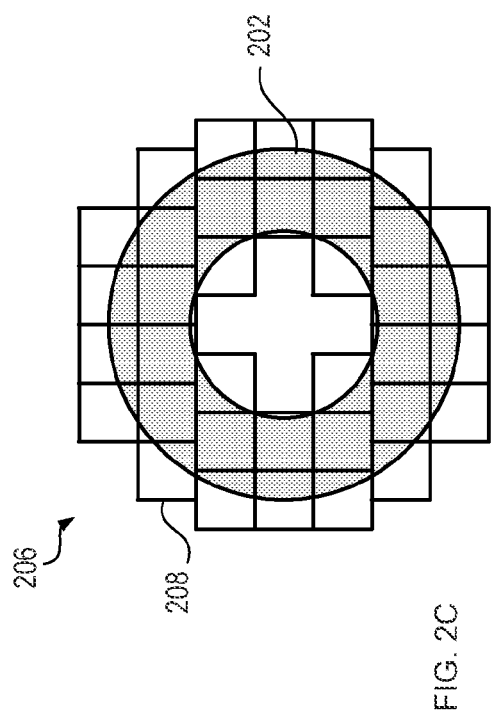

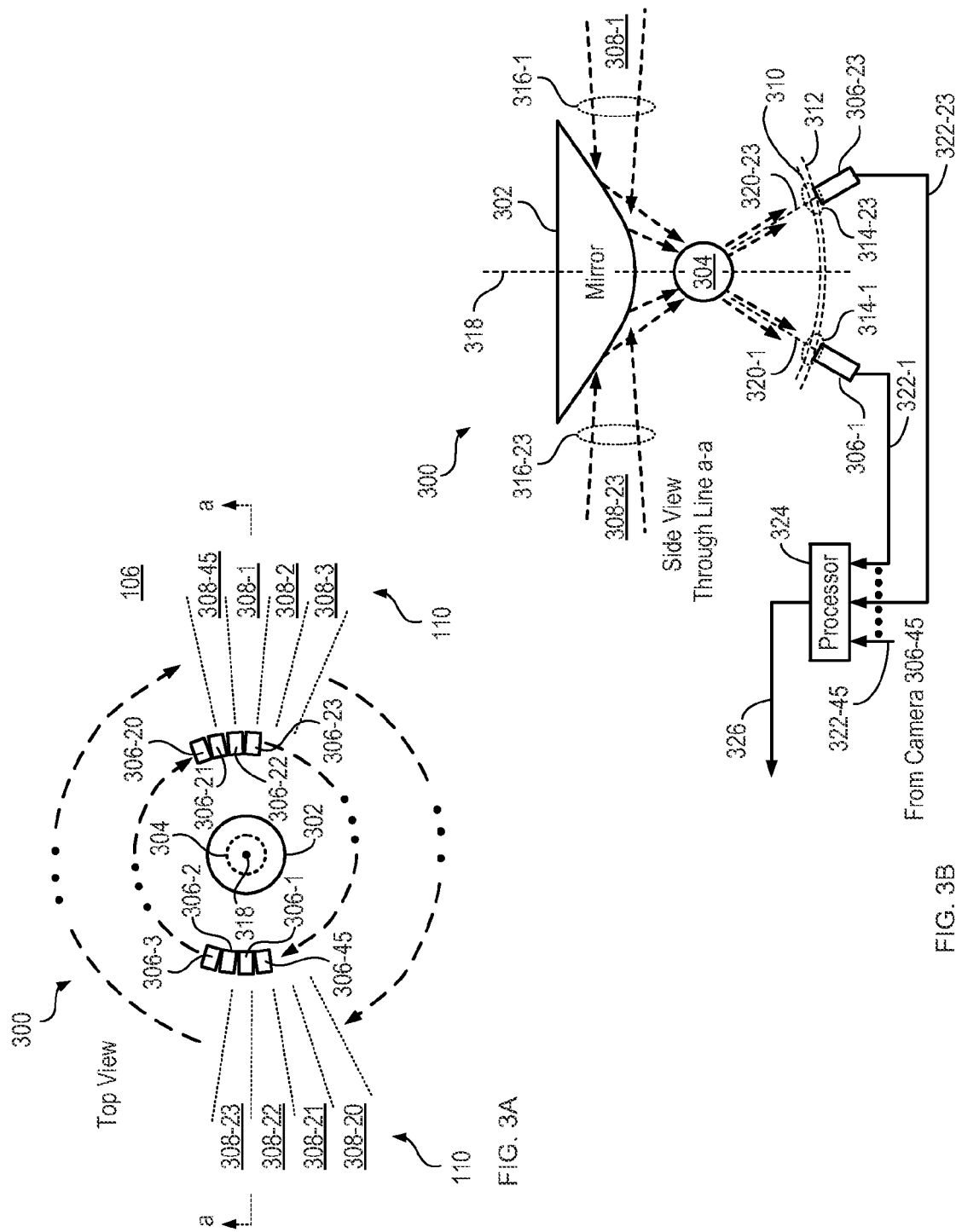

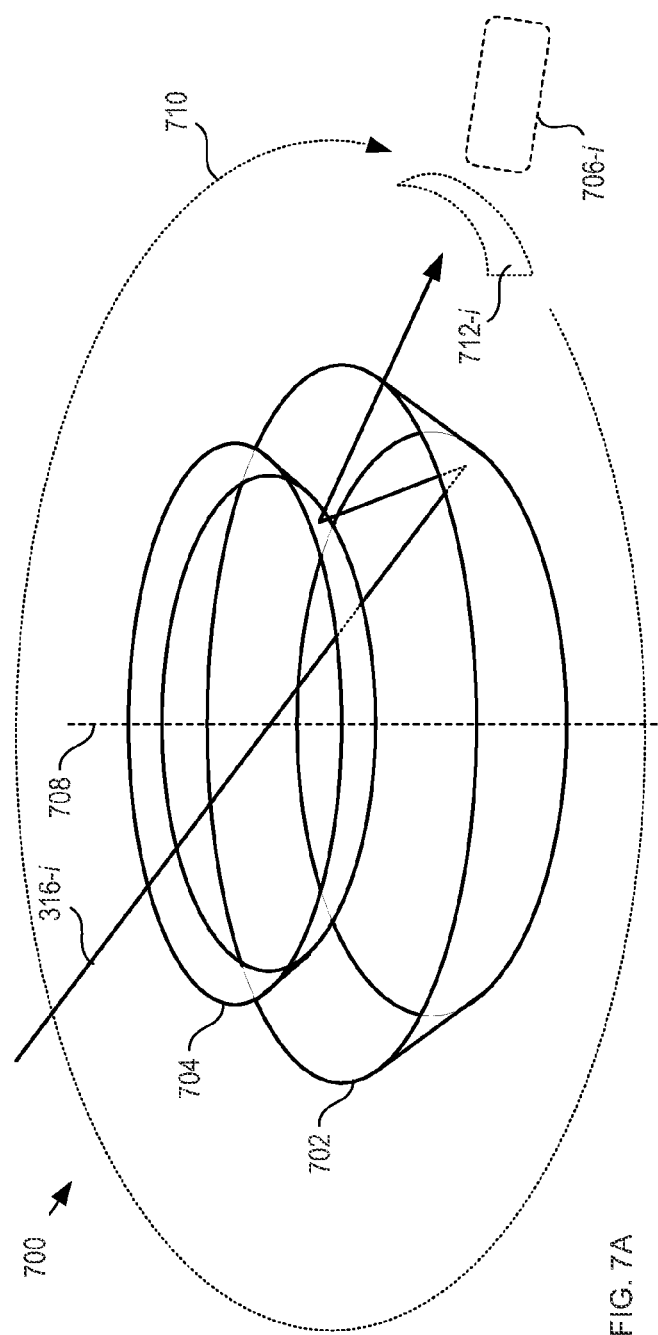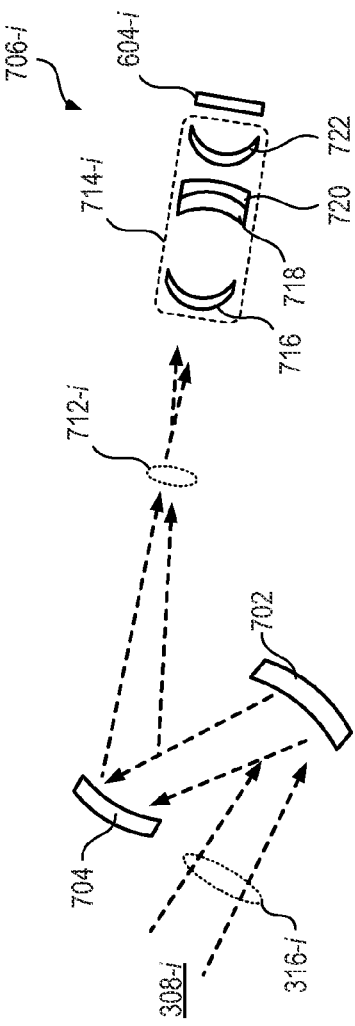
FIG. 7A
FIG. 7B

PANORAMIC MULTI-SCALE IMAGER AND METHOD THEREFOR

CROSS REFERENCE TO RELATED APPLICATIONS

This case is a continuation-in-part of co-pending U.S. patent application Ser. No. 13/095,407, filed Apr. 27, 2011, entitled "Monocentric Lens-based Multi-scale Optical Systems and Methods for Use", which claims the benefit of U.S. Provisional Patent Application Ser. No. 61/328,213, filed Apr. 27, 2010, and which is a continuation-in-part of U.S. patent application Ser. No. 12/651,894 (now U.S. Pat. No. 8,259, 212), filed Jan. 4, 2010, entitled "Multiscale Optical System", which claims priority to U.S. Provisional Patent Application Ser. No. 61/142,499, filed Jan. 5, 2009, each of which is incorporated by reference herein.

If there are any contradictions or inconsistencies in language between this application and one or more of the cases that have been incorporated by reference that might affect the interpretation of the claims in this case, the claims in this case should be interpreted to be consistent with the language in this case.

STATEMENT REGARDING FEDERALLY-SPONSORED RESEARCH

This invention was made with Government support under contract HR0011-10-C-0073, awarded by the Defense Advanced Research Projects Agency (DARPA). The Government has certain rights in the invention.

FIELD OF THE INVENTION

The present invention relates to imaging optics in general, and, more particularly, to panoramic imaging systems.

BACKGROUND OF THE INVENTION

A panorama is a "wide angle view" of the scene observed from a reference point. A goal in panoramic imaging is to capture a field of view around the reference point that includes a large azimuth (ideally 360°) and has a large vertical dimension as well. Typically, a panoramic imaging system images the panoramic scene onto an image plane, where it is measured using photographic film or an electronic sensor array.

One conventional method for capturing a panoramic image uses an ultra-wide angle lens to image a wide field-of-view onto the image plane. Unfortunately, such lenses cause significant distortion of the image—particularly as the azimuth approaches 180°.

Another approach for panoramic imaging relies on capturing a series of images with a conventional camera that is panned through a range of azimuth angles. The multiple images are then combined to form a composite image. Alternatively, a camera array having fields-of-view that diverge like spokes on a wheel can be used to generate the multiple images. Image stitching issues, slow imaging speed, and its general complexity make this approach undesirable.

To overcome some of the disadvantages of these panoramic imagers, improved systems were developed wherein a convex, shaped mirror is placed slightly above or below a conventional camera. Mirrors disclosed in the prior art include spherical, parabolic, and hyperboloidal mirrors having a wide field-of-view (up to 360°). Such imaging systems compress this wide field-of-view into a planar image having a standard field-of-view that fits within the extent of a traditional image sensor (e.g., focal-plane array, film, etc.) of the conventional camera, thereby enabling a perspective view of the scene in a single snapshot. Unfortunately, the field-of-view of a conventional camera is relatively small; therefore, the high degree of compression necessary give rise to significant reduction of the angular resolution of such imaging systems, among other drawbacks.

An efficient, high-resolution panoramic imager, therefore, remains unrealized in the prior art.

SUMMARY OF THE INVENTION

The present invention enables panoramic imaging without some of the costs and disadvantages of the prior art. Embodiments of the present invention are particularly well suited for use in surveillance systems, satellite systems, cameras, cell phones, teleconferencing systems, and the like.

Like some panoramic imagers known in the prior, embodiments of the present invention include a mirror that directs light from a scene surrounding the imager to an objective lens. The objective lens then forms an image based on this light at a curved image field. Such prior-art approaches have had limited success, however, due to problems associated with mapping the panoramic images onto planar sensing region and efficiency with which the scene is captured.

The present invention overcomes some or all of the problems of prior-art panoramic imagers by employing a multi-scale imaging system to image a scene via a primary mirror, such as a hyperboloidal mirror—thus forming a single-aperture, segmented focal plane imaging system. Multi-scale imaging systems are described in the parent case of this application, U.S. patent application Ser. No. 12/651,894, entitled "Multiscale Optical System." Embodiments of the present invention create a virtual sensor plane that is enabled by employing a plurality of individual cameras arranged at the curved image field of the objective lens. Each camera includes a secondary lens and a focal plane array, wherein each secondary lens relays a portion of the curved image field to form a sub-image that extends over a plurality of detector pixels of its respective focal plane array. This affords embodiments of the present invention advantages over prior-art panoramic images, such as:

i. improved image coverage by overlapping image portions captured by the cameras to avoid lost data at the gaps between prior-art sensor arrays; or ii. independent aberration correction on a pixel-by-pixel basis; or iii. enabling independent control of the focus of each camera; or iv. enabling independent compensation of optical distortion; or v. enabling parallel data transfer from the plurality of cameras to facilitate high-bandwidth image capture and image streaming; or vi. any combination of i, ii, iii, iv, and v.

An illustrative embodiment of the present invention includes a hyperboloidal mirror that reflects light from the scene to an objective lens. The objective lens forms an image of the scene at a first non-planar image field. A plurality of cameras, each including a secondary lens and a focal plane array, is arranged at the first image field such the secondary lenses are located at the first image field. Each secondary lens relays a portion of the image as a sub-image that is projected over a plurality of detector pixels of its respective focal plane array. In some embodiments, the mirror is other than a hyperboloidal mirror, such as a spherical mirror or parabolic mirror.

In some embodiments, the objective lens additionally provides correction of a first aberration introduced on the light from the scene by the hyperboloidal mirror. In some embodiments, at least one of the secondary lenses of the plurality of cameras provides further correction of the first aberration. In some embodiments, each of the objective lens and secondary lenses provides correction of a second aberration introduced on the light from the scene by the first mirror. In some embodiments, the objective lens is a monocentric lens. In some embodiments, the objective lens is a reflective lens comprising a second mirror, wherein the first mirror and second mirror collectively form an image of the scene at the first image field.

The secondary lens and focal plane array of each camera defines a first optical axis. Further, each camera defines a second axis that extends normally from the surface of the objective lens to the center of its respective secondary lens. In some embodiments, the first axis of each camera is non-colinear with its respective second axis. As a result, an image that is highly oblique to the second axis is nearly on-axis for the first axis. This enables each camera to correct residual aberrations more easily, since rays aligned with the optical axis of an optical system normally experience fewer aberrations than rays that are highly oblique to that optical axis. In some embodiments, each secondary lens includes a first surface that is not symmetric about the first axis of its respective camera. This enables the secondary lens to refract rays incident on the secondary lens from the direction of the objective lens so that the rays align with the first axis of the camera.

In some embodiments, the objective lens is a reflective lens comprising a second mirror. The first mirror and second mirror collectively form the image at the first image field.

An embodiment of the present invention is a panoramic imaging system comprising: a first mirror, the first mirror directing light from a scene to an objective lens; the objective lens, the objective lens forming an image based on the light at a first image field, wherein the objective lens is dimensioned and arranged to reduce the magnitude of a first aberration introduced on the light by the first mirror; and a plurality of cameras that segment the image into a plurality of image portions, wherein each of the plurality of cameras includes a secondary lens and a focal plane array having a plurality of detector pixels, each secondary lens being operative for (1) forming a sub-image based on the respective image portion of the camera, the sub-image being formed on a region of the focal plane array that includes at least two detector pixels, and (2) further reducing the magnitude of the first aberration.

BRIEF DESCRIPTION OF THE DRAWINGS

FIG. 2A depicts a schematic drawing of the field of view of imager 100.

FIG. 2B depicts a two-dimensional projection of panorama 108 onto focal plane array 114.

FIG. 2C depicts a two-dimensional projection of panorama 108 onto a mosaic of detector arrays.

FIGS. 3A and 3B depict schematic drawings of top and side views, respectively, of a panoramic imaging system in accordance with an illustrative embodiment of the present invention.

FIGS. 7A and 7B depict schematic drawings of perspective and cross-sectional views, respectively, of a panoramic imager in accordance with a first alternative embodiment of the present invention.

DETAILED DESCRIPTION

Figure 1:
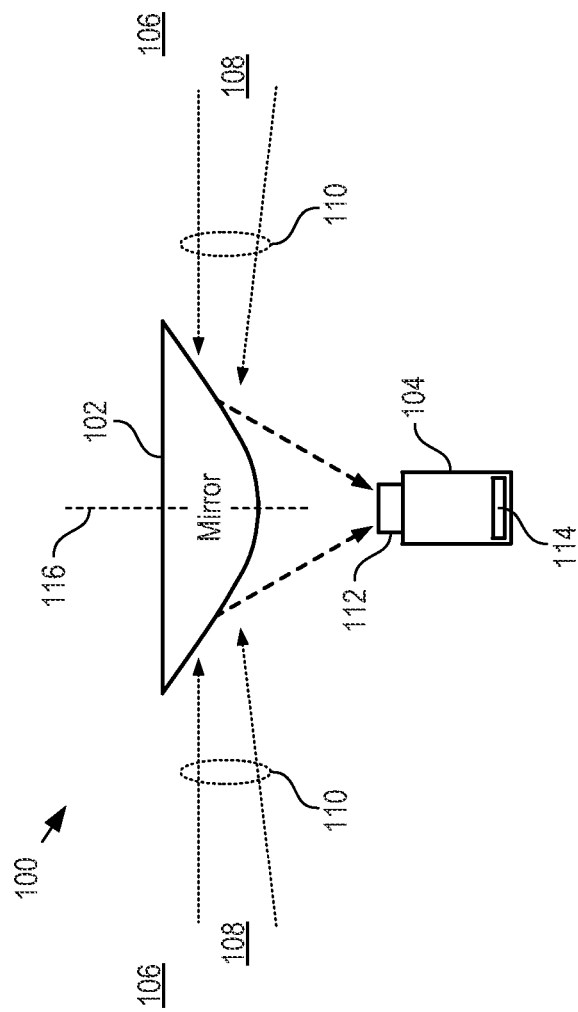
FIG. 1 depicts a schematic drawing of a side view of a panoramic imaging system in accordance with the prior art.

FIG. 1 depicts a schematic drawing of a side view of a panoramic imaging system in accordance with the prior art. Imager 100 comprises mirror 102 and camera 104. Imager 100 forms an image of panorama 108, which is a portion of scene 106. Panorama 108 extends 360° around the imager. Imager 100 is representative of panoramic imaging systems described in U.S. Pat. No. 7,123,777, which is incorporated herein by reference.

Mirror 102 is a convex reflective mirror having a substantially symmetric shape about axis of rotation 116. Examples of such mirrors include hyperboloidal mirrors, spherical mirrors, and parabolic mirrors. Mirror 102 receives light rays 110 from scene 106 and reflects them to camera 104.

Light rays 110 are received from mirror 102 at input lens 112, which forms an image on the surface of focal plane array 114.

Focal plane array 114 is a rectangular array of detector pixels, typically CCD elements. Each detector pixel converts its received light into a digital representation of the light from a point in scene 106.

FIG. 2A depicts a schematic drawing of the field of view of imager 100. Field-of-view 200 represents the potential full angular field of view, as observed from camera 104. Panorama 108 is a toroidal section of field-of-view 200 having a vertical dimension equivalent to an included angle within the range of about 5° to 10°. Panorama 108 is a full 360° view of scene 106 taken about axis of rotation 116.

FIG. 2B depicts a two-dimensional projection of panorama 108 onto focal plane array 114. Projection 202 is not well matched to the rectangular shape of focal plane array 114. As a result, imager 100 does not efficiently image scene 102 because many of detector pixels 204 in focal plane array 114 are simply not used. Further, imager 100 requires significant post-processing to convert the image into a viewable panoramic image. Still further, the resolution with which imager 100 can produce images is limited due to the fixed number of detector pixels 204 in focal plane array 114.

As discussed in the parent application of this case, the performance of an imager can be improved by tiling a plurality of sensors that collectively match the shape of an image projection. Using this concept, therefore, the performance of imager 100 could be improved by arranging a plurality of rectangular sensors in an arrangement that matches projection 202 (i.e., sensing the panoramic image with detector arrays "mosaicked" to match the projection of the image shape).

FIG. 2C depicts a two-dimensional projection of panorama 108 onto a mosaic of detector arrays. Mosaic 206 includes a two-dimensional arrangement of detector arrays 208. Detector arrays are arranged in a non-regular pattern so as to maximize their coverage of projection 202.

Mosaic 206 improves the efficiency with which imager 100 images scene 102 since it does not include detector arrays within the interior of panorama 202, although many detector pixels are still unused. Unfortunately, even employing mosaicked detector arrays, imager 100 would still suffer from lost image regions due to gaps between active portions of the mosaicked detector arrays (i.e., the non-active edge regions of adjacent detector arrays 208).

Further, since projection 202 is a two-dimensional representation of a panorama that has curvature in three dimensions, imager 100 is unable to compensate for defocus due to field-curvature. Imager 100 is also unable to correct aberrations introduced by both mirror 102 and input lens 112. Finally, the mosaicked detector arrays could not compensate for optical distortion.

The panoramic lens design of imager 100 naturally gives rise to field curvature issues in projection 202. This could be accounted for by arranging the mosaicked detector arrays on a curved surface that matches the field curvature. During typical operation of imager 100, however, the use of adaptive focusing would require that the radius of curvature of this curved surface be adaptable in real time as well. Adapting the radius of curvature of the arrangement of the detector arrays, however, is difficult, if not impossible.

Still further, when the panoramic view of imager 100 is reduced to accommodate a finite sampling geometry, field-dependent distortion and aberration are introduced. These degradations of image quality cannot be easily compensated for in imager 100—even with mosaicked detector arrays.

It is an aspect of the present invention that combining a suitable mirror, such as a hyperboloidal mirror, with a multi-scale optical system to form a panoramic imager mitigates some or all of the disadvantages of prior-art panoramic imaging systems. Specifically, a multi-scale imager in accordance with the present invention captures the panorama focused on a curved surface by creating a "virtual sensor plane" that can include overlap between the image portions captured by an arrangement of individually controllable cameras, each having a secondary lens and a detector array (i.e., focal plane array). As a result, the present invention avoids missing image data due to gaps between detector arrays. In addition, each individual sensor array is part of a camera that can provide independent aberration correction, focus control, and exposure control.

FIGS. 3A and 3B depict schematic drawings of top and side views, respectively, of a panoramic imaging system in accordance with an illustrative embodiment of the present invention. Imager 300 comprises mirror 302, objective lens 304, and cameras 306-1 through 306-45. Imager 300 is a panoramic imager operative for forming an image of a 360° view around mirror 302 (i.e., scene 106). For clarity, only some of cameras 306-1 through 306-45 are depicted in FIGS. 3A and 3B.

Figure 4:
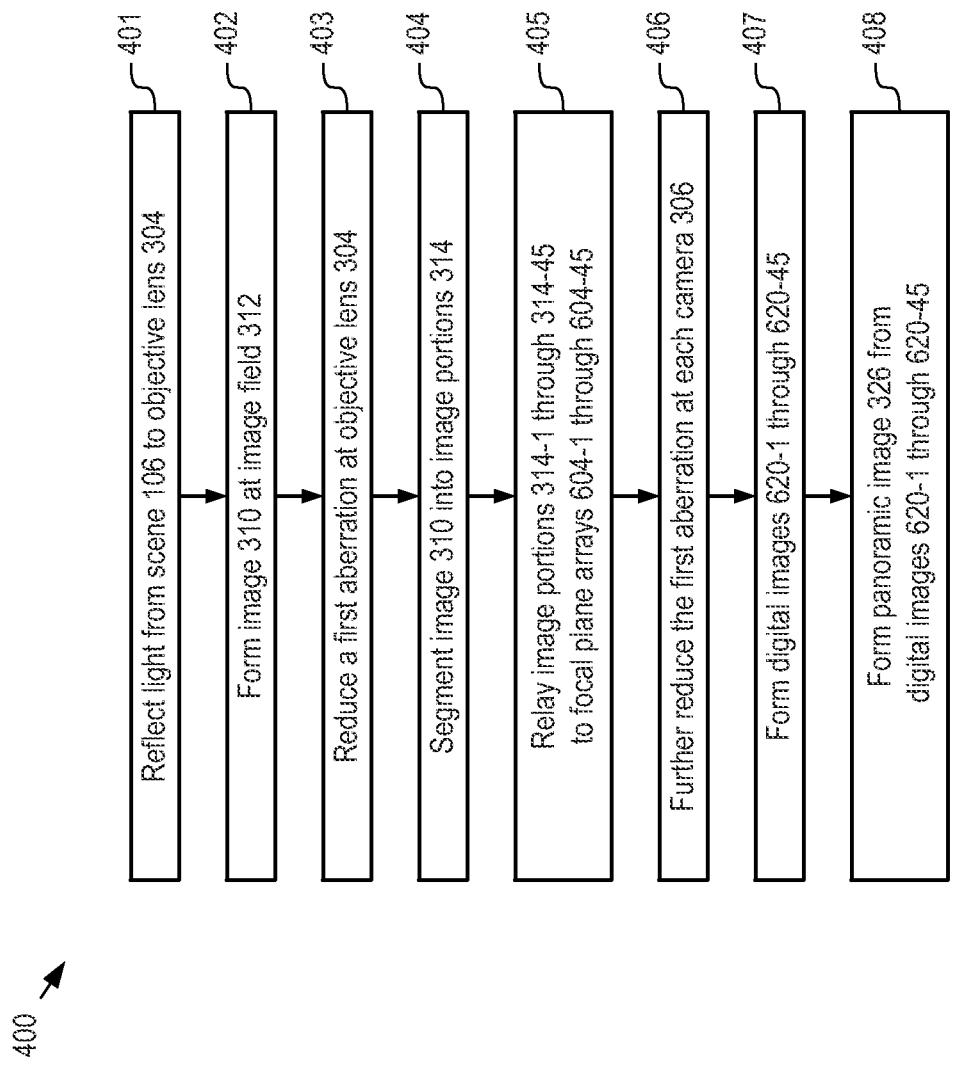
FIG. 4 depicts operations of a method for forming a panoramic image of a scene in accordance with the illustrative embodiment of the present invention.

FIG. 4 depicts operations of a method for forming a panoramic image of a scene in accordance with the illustrative embodiment of the present invention. Method 400 begins with operation 401, wherein mirror 302 directs light rays 110 from scene 106 to objective lens 304.

Mirror 302 is a convex hyperboloidal mirror having a 190 mm-diameter. Mirror 302 directs light rays 110 from scene 106, such that the rays cover an approximately 360° horizontal field having an elevation of approximately 17°. One skilled in the art will recognize that the particular shape, size, and field-of-view of mirror 302 are matters of design choice and that there are myriad suitable designs for mirror 302.

Mirror 302 is analogous to mirror 102 described above and with respect to FIG. 1. Although in the illustrative embodiment, mirror 302 is a hyperboloidal mirror, it will be clear to one skilled in the art, after reading this Specification, how to make and use alternative embodiments wherein mirror 302 is another type of mirror. Examples of mirrors suitable for use in the present invention include, without limitation, spherical mirrors, parabolic mirrors, and the like.

At operation 402, objective lens 304 forms image 310 based on light rays 110 received from mirror 302.

Figure 5:
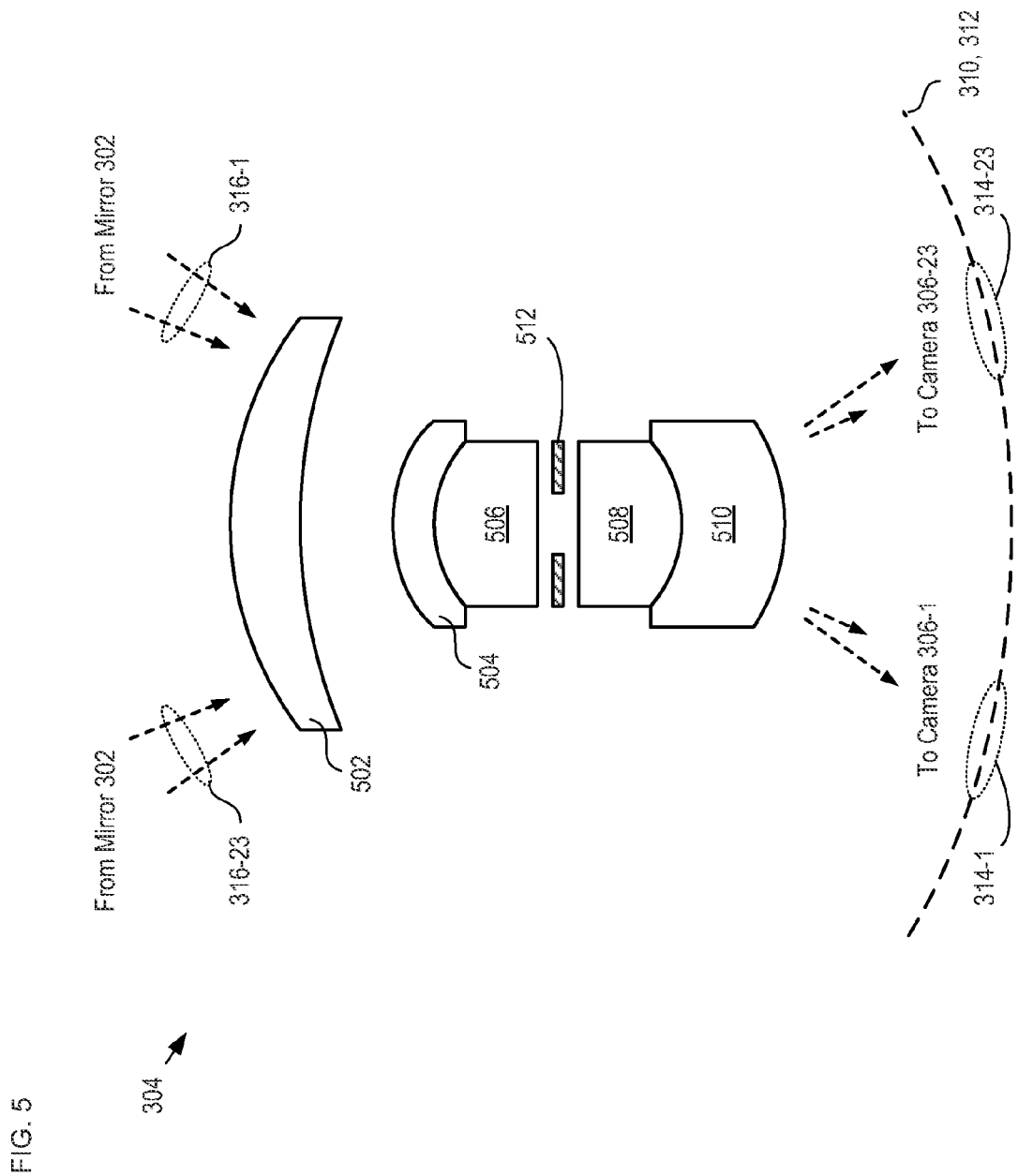
FIG. 5 depicts a schematic drawing of a cross-sectional view of an objective lens in accordance with the illustrative embodiment of the present invention.

FIG. 5 depicts a schematic drawing of a cross-sectional view of an objective lens in accordance with the illustrative embodiment of the present invention. Objective lens 304 is a multi-element lens comprising lens elements 502, 504, 506, 508, and 510, and stop 512.

Each of lens elements 502, 504, 506, 508, and 510 is a glass element having spherical optical surfaces. Lens elements 502, 504, 506, 508, and 510 collectively form generally curved image 310 at image field 312. It will be clear to one skilled in the art how to assemble and hold the arrangement of lens elements 502, 504, 506, 508, and 510 to form a mechanically stable objective lens 304.

Objective lens 304 includes stop 512, which is located between lens elements 506 and 508. In some embodiments, stop 512 is not located in objective lens 304 and is, instead, included in each camera 306. In some embodiments, stop 510 is included in objective lens 304 as well as each camera 306.

One skilled in the art will recognize that the design of lens 304 is based on its operation in concert with mirror 302 and that the specific design parameters (e.g., materials, radius of curvature, thickness, refractive index, Abbe number, etc.) for the elements of objective lens 304 can encompass myriad possibilities. For example, one skilled in the art will recognize that the material choices made for the elements of lens 304 could include any of, for example and without limitation, calcium fluoride, fused silica, BK-7 glass, SK-7 glass, fluorocrown glass, magnesium fluoride, or plastics.

It should be noted that objective lens 304 represents only one possible lens design suitable for use in imager 300. Non-monocentric lens design principles applicable to the present invention, as well as a discussion of design methodology, are disclosed in the parent case to this application.

Further, one skilled in the art will recognize that, although objective lens 304 comprises only refractive surfaces, an objective lens in accordance with the present invention can include all reflective surfaces, or a combination of refractive and reflective surfaces (e.g., a catadioptric lens).

In some embodiments, objective lens 304 is a monocentric lens that identically focuses light coming from any direction. The use of a monocentric objective lens is particularly attractive for use in very wide-field viewing applications, such as the objection lens in embodiments of the present invention. Monocentric lens design principles and design methodology applicable to the present invention are disclosed in U.S. patent application Ser. No. 13/095,407, which is incorporated herein by reference.

At operation 403, objective lens 304 mitigates aberration introduced by mirror 302. Specifically, lens elements 502, 504, 506, 508, and 510 are designed to collectively reduce the magnitude of at least one optical degradation introduced by mirror 106, including, without limitation:

i. spherical aberration; or
  ii. coma; or
  iii. astigmatism; or
  iv. any combination of i, ii, and iii.

At operation 404, cameras 306-1 through 306-45 (referred to, collectively, as cameras 306) segment image 310 into image portions 314-1 through 314-45, respectively. Image portions 314-1 through 314-45 (referred to, collectively, as image portions 314) include light rays 316-1 through 316-45, respectively, which are directed from objective lens 304 to cameras 306-1 through 306-45 along optical axes 320-1 through 320-45, respectively. Light rays 316-1 through 316-45 are those portions of light rays 110 that originate from scene portions 308-1 through 308-45, respectively.

Cameras 306 are arranged in a close-packed arrangement that matches the curved shape of image field 312. Cameras 306-1 through 306-45 segment image 310 into scene portions 308-1 through 308-45, each of which corresponds to a section of scene 106 having a horizontal included angle of approximately 8°. Each camera 306 has a field of view that is roughly equal in width and height. As a result, cameras 306 collectively have a field of view that is approximately 360° in azimuth and approximately 8° in elevation. In some embodiments, cameras 306 are arranged in a two-dimensional arrangement having multiple rows of cameras, each having approximately 8° of elevation angle. For a two-row arrangement, therefore, cameras 306 would image a 360° by approximately 16° region of scene 106, a three-row arrangement would image a 24° high region, and so on.

Although the illustrative embodiment comprises 45 cameras, each having a field of view of approximately 8°×8°, it will be clear to one skilled in the art, after reading this Specification, how to make and use alternative embodiments of the present invention comprising any practical number of cameras having one or more fields of view of any practical size.

Figure 6:
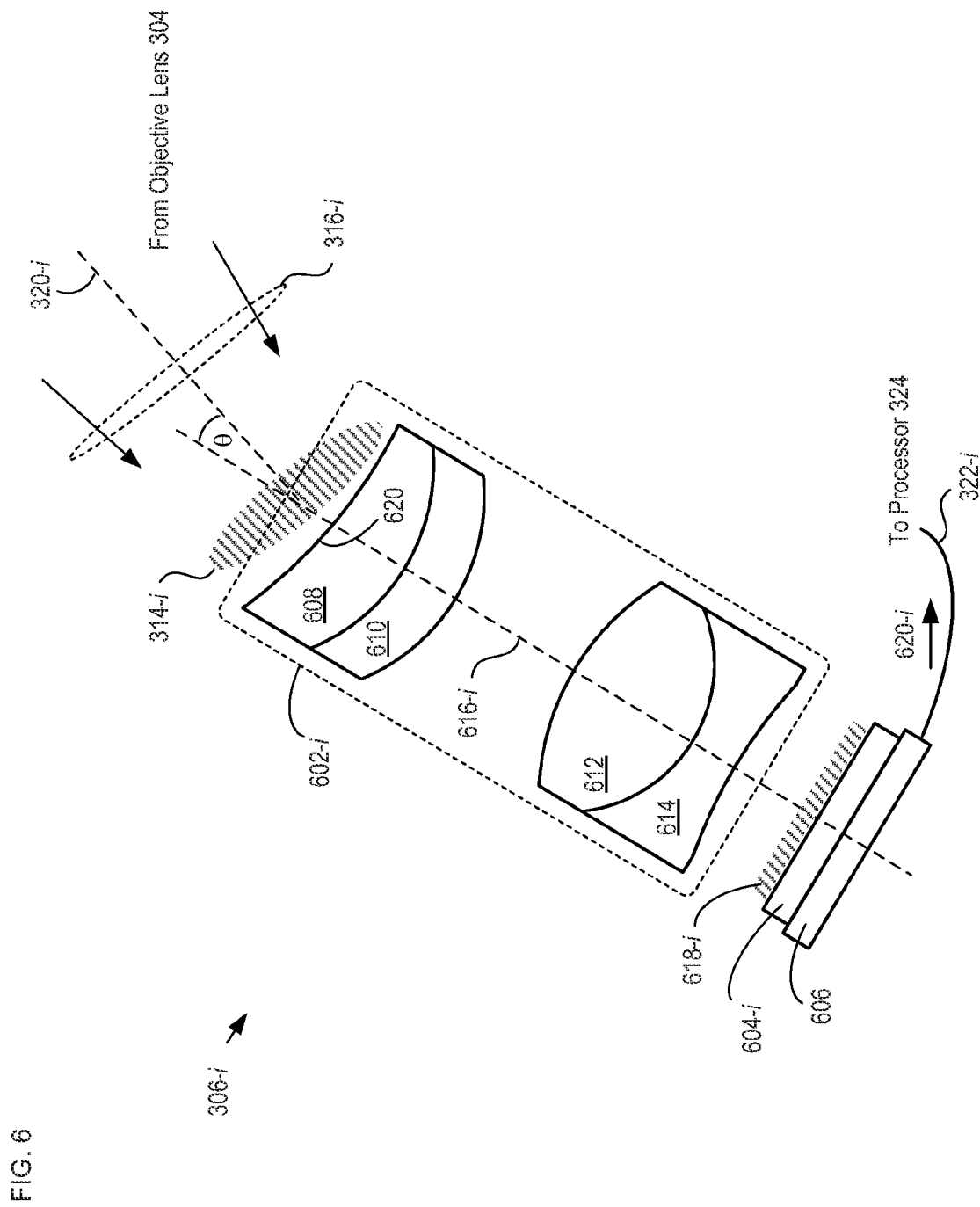
FIG. 6 depicts a schematic drawing of a cross-sectional view of a camera in accordance with the illustrative embodiments of the present invention.

FIG. 6 depicts a schematic drawing of a cross-sectional view of a camera in accordance with the illustrative embodiments of the present invention. Camera 306-*i* comprises secondary lens 602-*i*, focal plane array 604-*i*, and read-out integrated circuit 606. Camera 306-*i* is representative of each of cameras 306-1 through 306-45. Cameras 306 are arranged at image field 312 such that the first surface of each of secondary lenses 602-1 through 602-45 is located substantially at the image field.

Secondary lens 602-*i* comprises lens elements 608, 610, 612, and 614. Each of lens elements 608, 610, 612, and 614 is preferably a plastic lens suitable for plastic molding fabrication. The use of plastic molding processes, such as injection molding, to fabricate lens elements 608, 610, 612, and 614 enables relatively inexpensive mass production of lenses having complex surfaces and, therefore, inexpensive production of cameras 306. Examples of plastics suitable for use in secondary lens 602-*i* include, without limitation, E48R (available from Zeon Chemicals), OKP4 (available from Osaka Gas Chemicals), and the like. In some embodiments, one or more of lens elements 608, 610, 612, and 614 is a glass lens. It will be clear to one skilled in the art how to assemble and hold the arrangement of lens elements 608, 610, 612, and 614 to form a mechanically stable secondary lens 602-*i*.

At operation 405, at each of cameras 306, secondary lens 602-*i* relays image portion 314-*i* to focal plane array 604-*i* along optical axis 616-*i*.

Image portion 314-*i* comprises light that propagates from objective lens 304 to camera 306-*i* along optical axis 320-*i*. Camera 306-*i* is arranged relative to objective lens 304 such that optical axis 616-*i* and optical axis 320-*i* are not co-linear. In other words, optical axis 616-*i* and optical axis 320-*i* form an angle, θ, that is non-zero. In addition, surface 620 of lens element 608 is not symmetric about optical axis 616-*i*. As a result, lens element 608 refracts light propagating along optical axis 320-*i* to align it with optical axis 616-*i*.

By placing the optical axis of each camera 306-*i* at an angle relative to its respective optical axis 320-*i*, an image that is highly oblique to objective lens 304 is nearly on-axis with optical axis 616-*i*. This facilitates the correction of residual aberrations by camera 306-*i* because light rays emanating from a point traveling aligned with the optical axis of a system typically experience few aberrations than highly oblique light rays.

In some embodiments, optical axes 320-*i* and 616-*i* are substantially co-linear.

At operation 406, secondary lens 602 mitigates an optical degradation in image portion 314-*i*. In some embodiments, secondary lens 602 further reduces the magnitude of at least one residual optical degradation originally introduced by mirror 106 and not completely corrected by objective lens 304.

Prior-art panoramic imagers typically use a standard monolithic camera that images a diverging lens or convex mirror to achieve their panoramic view. Unfortunately, diverging lenses or mirrors enable the camera to capture light rays that arrive at the lens or mirror from 90° off axis or more. Such light typically requires significant aberration correction at the camera, the amount of which is proportional to the size of the entrance pupil of the camera, which requires highly complex optical designs that include more elements and aspheric surfaces that are very expensive to manufacture. In order to mitigate this effect, strongly diverging elements are placed in front of most conventional wide-angle lenses and panoramic imagers to significantly reduce the size of their entrance pupil—thus reducing the amount of aberration correction required. Unfortunately, reducing the entrance pupil also degrades the achievable resolution of a panoramic imager.

By employing a multi-scale design, wherein the objective lens and each camera correct aberrations introduced by mirror 302, embodiments of the present invention enable resolution of a greater number of pixels than is achievable by conventional panoramic imagers. Further, by splitting the task of imaging between objective lens 304 and cameras 306, mirror 302 and objective lens 304 need only form a crude image at image field 312. Each camera 306 can then correct its respective image portion 314.

In some embodiments, secondary lens 602-*i* is designed such that it changes the magnification of image portion 314-*i* as well, which enables sub-image 618-*i* to be formed on the planar array of detector pixels of focal plane array 604-*i*.

In some embodiments, each of cameras 306 includes an automatic focusing mechanism. In such embodiments, cameras 306 can account for the use of adaptive focus in imager 300 by dynamically adjusting the focus of their respective sub-images as the focus of image 310 changes. In some embodiments, autofocus is enabled by a helical focusing arrangement in cameras 306. In some embodiments, autofocus is enabled by translating focal plane array 604-*i* along the optical axis 616-*i*. Autofocus capability enables some embodiments of the present invention to focus different portions of scene 106 at different depths.

In some embodiments, each of cameras 306 comprises an optical filter, such as a polarization or color filter. As a result, such embodiments comprise a capability for analyzing a portion of scene 106 by examining the polarization and/or spectral signature of that portion.

At operation 407, digital images of sub-images 618-1 through 618-45 are produced. Sub-image 618-*i* is received from secondary lens 602-*i* at focal plane array 604-*i*.

Focal plane array 604-*i* is a conventional focal plane array comprising a two-dimensional arrangement of 1.5 million charge-coupled device (CCD) elements 502 having a size of approximately 1.5 microns. The total size of focal plane array 604-*i* is suitable for completely sampling an optical sub-image having a diameter of approximately 3 mm. One skilled in the art will recognize that the size of focal plane array 604-*i* and the number of detector pixels included in it are matters of design choice and that focal plane array 604-*i* can have any suitable practical size and pixel density.

In some embodiments of the present invention, focal plane array 604-*i* comprises a two-dimensional arrangement of another photosensitive device, such as a CMOS sensor, photodetector, avalanche photodiode, and the like. It will be clear to one skilled in the art how to specify, make, and use focal plane array 604-*i*.

Focal plane array 604-*i* is mechanically and electrically coupled with a conventional read-out integrated circuit 606. Focal plane array 604-*i* and read-out integrated circuit 606 collectively generate digital image 620-*i* and provide it to processor 324 on signal line 322-*i*.

At operation 408, processor 324 combines digital images 620-1 through 620-45 to form panoramic image 326.

As discussed above, cameras 306 are arranged in a close-packed arrangement that matches the curved shape of image field 312. In some embodiments, cameras 306 are arranged such that their fields of view are slightly overlapped. As a result, panoramic image 326 can have a substantially complete image of the full 360° scene around imager 300.

FIGS. 7A and 7B depict schematic drawings of perspective and cross-sectional views, respectively, of a panoramic imager in accordance with a first alternative embodiment of the present invention. Imager 700 includes primary mirror 702, secondary mirror 704, and cameras 706-1 through 706-45. For clarity, only one set of light rays 316-*i* from scene 106 and one camera (i.e., camera 706-*i*) are depicted in FIGS. 7A and 7B.

Primary mirror 702 is an annular mirror having a diameter of approximately 440.1 mm and a radius of curvature of approximately 257.6 mm out of its annular plane. Primary mirror 702 is symmetric about axis 708. In some embodiments, primary mirror 702 is a glass (e.g., BK7) annulus with a reflective metal coating on its interior surface having high reflectivity for light rays 316-*i*.

Secondary mirror 704 is an annular mirror having a diameter of approximately 214.3 mm and a radius of curvature of approximately 150.4 mm out of its annular plane. Secondary mirror 704 is also symmetric about axis 708. In some embodiments, secondary mirror 704 is a glass (e.g., BK7) annulus with a reflective metal coating on its outer surface having high reflectivity for light rays 316-*i*.

Mirrors 702 and 704 collectively image light from scene 106 at image field 710, which extends 360° around arrangement 700. Image field 710 is analogous to image field 312, described above and with respect to FIGS. 3A and 3B.

As discussed above, light rays 316-*i* are the light rays 110 that originate from scene portion 308-*i* of scene 106.

Camera 706-*i* includes secondary lens 716-*i* and focal plane array 604-*i*. Cameras 706-1 through 706-45 (referred to, collectively, as cameras 706) are analogous to cameras 306-1 through 306-45 described above and with respect to FIGS. 3-6. Camera 706-*i* relays image portion 712-*i* of scene 710 as sub-image 714-*i* onto focal plane array 604-*i* via secondary lens 716-*i*.

Secondary lens 716-*i* includes lens elements 718, 720, 722, and 724, which are designed for operation with mirrors 702 and 704.

Lens element 718 is a BK7 lens having a diameter of approximately 25.9 mm, a convex front surface having a radius of curvature of approximately 15.6 mm and a convex back surface having a radius of curvature of approximately 15.2 mm.

Lens element 720 is an SF6 lens having a diameter of approximately 15 mm, a concave front surface having a radius of curvature of approximately 19.7 mm and a concave back surface having a radius of curvature of approximately 16.3 mm.

Lens element 722 is an SF8 lens having a diameter of approximately 16.5 mm, a concave front surface having a radius of curvature of approximately 36.2 mm and a concave back surface having a radius of curvature of approximately 18.04 mm.

Lens element 724 is a BK7 lens having a diameter of approximately 15.2 mm, a convex front surface having a radius of curvature of approximately 9.13 mm and a convex back surface having a radius of curvature of approximately 16.27 mm.

Secondary lens 716-*i* provides approximately 4× magnification, which enables cameras 706 to be arranged around mirrors 702 and 704 in a non-contiguous arrangement, yet contiguously sample image field 710.

One skilled in the art will recognize that the design parameters provided here for mirrors 702 and 704 and cameras 706 are merely exemplary and that a myriad of suitable optical designs for imager 700 exist.

Figure 8A:
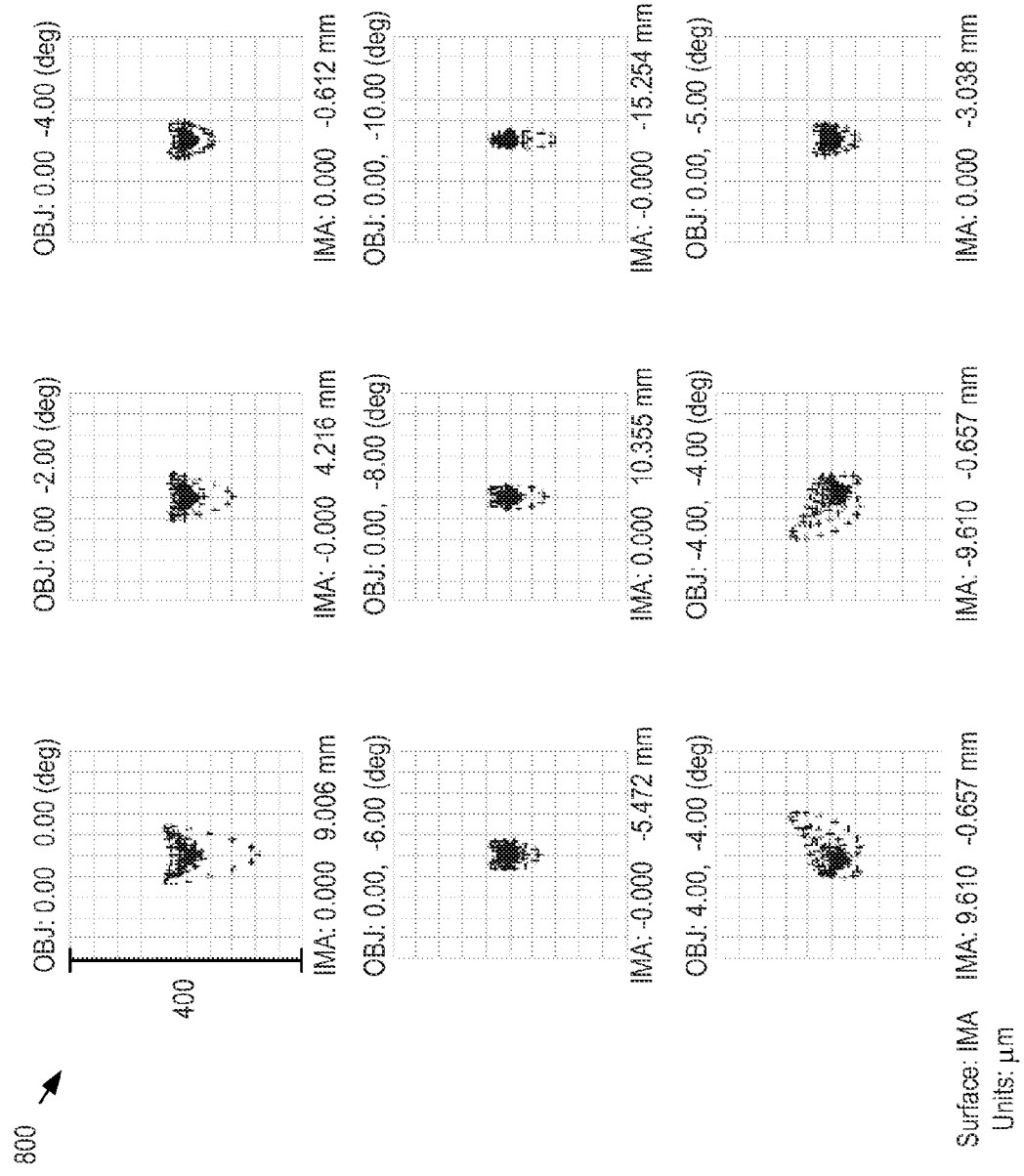
FIGS. 8A and 8B depict spot diagrams of an image portion and its corresponding sub-image, respectively, in accordance with the first alternative embodiment of the present invention.
Figure 8B:
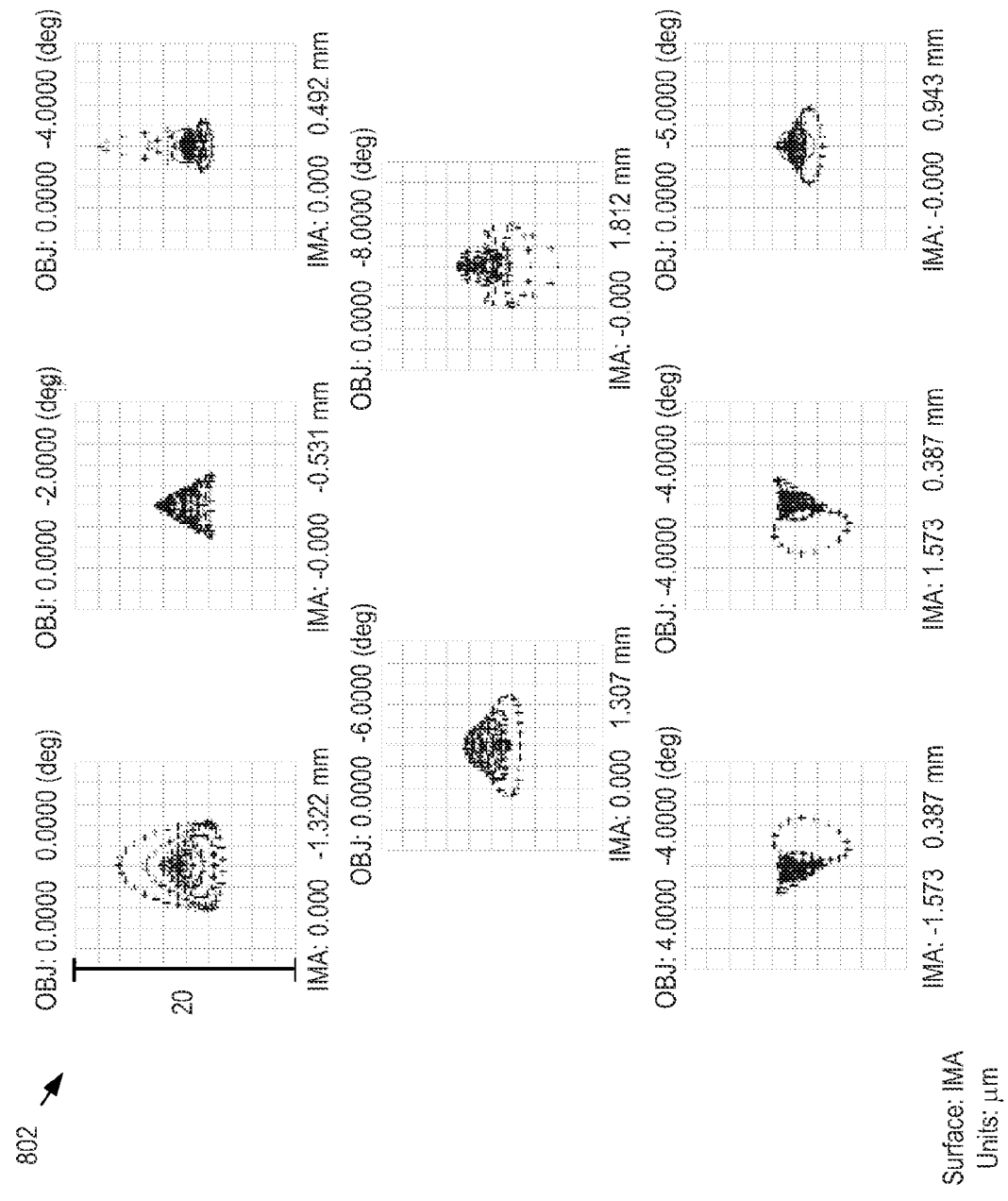

FIGS. 8A and 8B depict spot diagrams of an image portion and its corresponding sub-image, respectively, in accordance with the first alternative embodiment of the present invention.

Plot 800 shows measured spot size diagrams for an exemplary system of the design of panoramic imager 700, taken at image field 710 (i.e., for image portion 712-*i*).

Plot 802 depicts spot size diagrams for an exemplary system of the design of panoramic imager 700, taken at the surface of focal plane array 604-*i*.

Plots 800 and 802 demonstrate that, like cameras 306, cameras 706 enable enhanced image resolution.

It is to be understood that the disclosure teaches just one example of the illustrative embodiment and that many variations of the invention can easily be devised by those skilled in the art after reading this disclosure and that the scope of the present invention is to be determined by the following claims.

The following claims are presented for examination:

1. A panoramic imaging system comprising:
   a first mirror, the first mirror directing light from a scene to an objective lens;
   the objective lens, the objective lens forming an image based on the light at a first image field, wherein the objective lens is dimensioned and arranged to reduce the magnitude of a first aberration introduced on the light by the first mirror; and
   a plurality of cameras that segment the image into a plurality of image portions, wherein each of the plurality of cameras includes a secondary lens and a focal plane array having a plurality of detector pixels, each secondary lens being operative for (1) forming a sub-image based on the respective image portion of the camera, the sub-image being formed on a region of the focal plane array that includes at least two detector pixels, and (2) further reducing the magnitude of the first aberration.

2. The imaging system of claim 1 wherein the first mirror is a hyperboloidal mirror.

3. The imaging system of claim 1 wherein the first aberration is selected from the group consisting of spherical aberration, coma, and astigmatism.

4. The imaging system of claim 1 wherein each of the plurality of cameras has a first optical axis, and wherein the plurality of cameras are arranged at the first image field in a non-planar arrangement such that the plurality of first optical axes are non-parallel.

5. The imaging system of claim 4 wherein each of the plurality of cameras includes a first surface that is non-symmetric about the first optical axis, the first surface being proximal to the objective lens.

6. The imaging system of claim 4 wherein the objective lens and the plurality of cameras are arranged to define a plurality of second optical axes, each second optical axis extending from the objective lens to a different one of the plurality of cameras, and wherein each of the plurality of cameras is arranged to receive light from the objective lens along its respective second optical axis, and further wherein each of the plurality of second optical axes is non-co-linear with the first optical axis of its respective camera.

7. The imaging system of claim 1 further comprising a second mirror, the objective lens comprising the second mirror, wherein the first and second mirror collectively image the scene at the first image field.

8. The imaging system of claim 1 wherein the objective lens is a monocentric lens.

9. A panoramic imaging system comprising:
a first mirror;
an objective lens, the objective lens operative to form an image of a scene at a first image field having a first shape that is non-planar, the objective lens imaging the scene via the first mirror; and
a plurality of cameras that is operative to segment the image into a plurality of image portions, each of the plurality of cameras including a secondary lens and a focal plane array that collectively define a first optical axis, wherein each secondary lens is operative to image its respective image portion onto a plurality of detector pixels of its corresponding focal plane array, and wherein the plurality of secondary lenses is arranged in a non-planar arrangement having the first shape.

10. The imaging system of claim 9 wherein the first mirror is a hyperboloidal mirror.

11. The imaging system of claim 9 wherein the objective lens is operative to reduce a first aberration introduced on the image by the first mirror, and wherein each secondary lens is operative to further reduce the first aberration in its respective image portion.

12. The imaging system of claim 11 wherein the first aberration is selected from the group consisting of spherical aberration, coma, and astigmatism.

13. The imaging system of claim 9 further comprising a second mirror, the objective lens comprising the second mirror, wherein the first and second mirror collectively image the scene at the first image field.

14. The imaging system of claim 9 wherein the objective lens is a monocentric lens.

15. The imaging system of claim 9 wherein each of the plurality of cameras includes a first surface that is non-symmetric about the first optical axis, the first surface being proximal to the objective lens.

16. The imaging system of claim 9 wherein the objective lens and the plurality of cameras are arranged to define a plurality of second optical axes, each second optical axis extending from the objective lens to a different one of the plurality of cameras, and wherein each of the plurality of cameras is arranged to receive light from the objective lens along its respective second optical axis, and further wherein each of the plurality of second optical axes is non-co-linear with the first optical axis of its respective camera.

17. A method for forming a panoramic image of a scene, the method comprising:

receiving light from a scene at a first mirror that reflects the light to an objective lens;
forming a first image of the scene at a first image field that is non-planar, wherein the first image is formed by the objective lens based on the reflected light;
segmenting the first image into a plurality of image portions, wherein the first image is segmented by a plurality of cameras that are arranged in a non-planar arrangement, each of the plurality of cameras including a focal plane array and a secondary lens operative to relay a portion of the first image field onto the focal plane array;
imaging each of the plurality of image portions as a sub-image on a region of a different one of the plurality of focal plane arrays, each region comprising a plurality of detector pixels.

18. The method of claim 17 further comprising:
generating a digital image of each of the plurality of sub-images; and
forming a digital image of the scene based on the plurality of digital images.

19. The method of claim 17 further comprising reducing the magnitude of a first aberration such that the first aberration has a first magnitude in the reflected light, a second magnitude in the first image that is less than the first magnitude, and a third magnitude in at least one of the plurality of sub-images that is less than the second magnitude.

20. The method of claim 19 further comprising:
providing the objective lens such that it reduces the magnitude of the first aberration; and
providing at least one of the plurality of cameras such that its secondary lens further reduces the magnitude of the first aberration.

21. The method of claim 20 further comprising providing each of the objective lens and the at least one of the plurality of cameras such that the first aberration is selected from the group consisting of spherical aberration, coma, and astigmatism.

22. The method of claim 17 further comprising providing the first mirror as a hyperboloidal mirror.

23. The method of claim 17 further comprising providing the plurality of cameras such that (1) its respective focal plane array and secondary lens collectively define a first optical axis and (2) each of the plurality of cameras includes a first surface that is non-symmetric about the first optical axis, the first surface being proximal to the objective lens.

24. The imaging system of claim 17 further comprising:
providing the plurality of cameras such that its respective focal plane array and secondary lens collectively define a first optical axis; and
providing the objective lens and the plurality of cameras in an arrangement that defines a plurality of second optical axes, each of the plurality of second optical axes extending from the objective lens to a different one of the plurality of cameras, wherein each of the plurality of second optical axes is non-co-linear with the first optical axis of its respective camera; and
wherein the light of the image portion received at each of the plurality of cameras propagates along its respective second optical axis.

25. The method of claim 17 further comprising providing the objective lens as a second mirror.

* * * * *